UNITED STATES PATENT OFFICE.

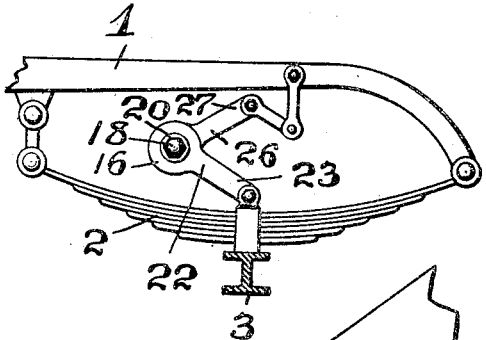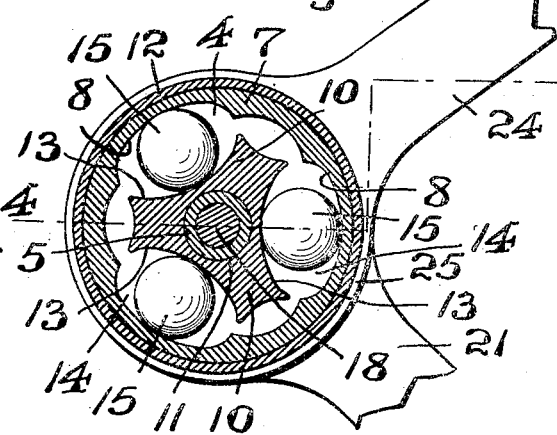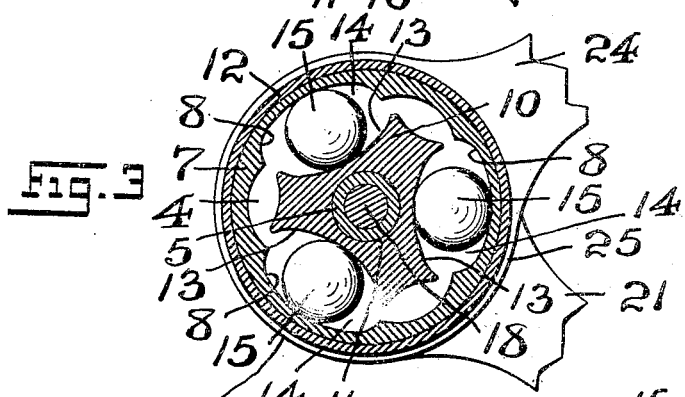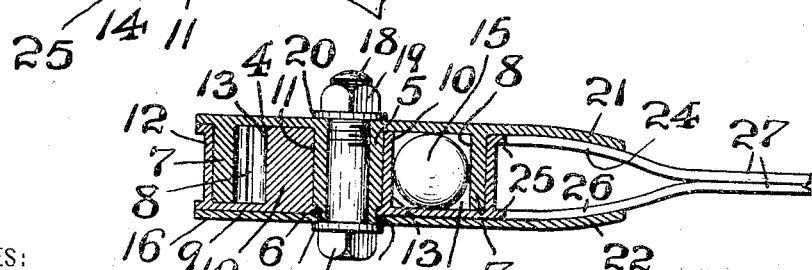

BASIL W. MATTHEWS, OF NEWARK, NEW JERSEY.

SHOCK-ABSORBER.

1,054,010.  Specification of Letters Patent.  Patented Feb. 25, 1913.

Application filed April 29, 1912. Serial No. 693,805.

*To all whom it may concern:*

Be it known that I, BASIL W. MATTHEWS, a citizen of the United States, residing at Newark, in the county of Essex and State of New Jersey, have invented certain new and useful Improvements in Shock-Absorbers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in shock-absorbers for use in connection with vehicles, such as automobiles, and the like; and, the invention relates, more particularly, to a device adapted to be interposed between the body of the vehicle and the springs thereof, by means of which sudden shocks or jars, transmitted from the traction-mechanism to the vehicle-springs, will be absorbed and counteracted by the novel shock-absorbing device, while at the same time the free resilient action of the vehicle-springs is not interfered with.

The invention has for its principal object to provide a simple and effective shock-absorbing device which is composed of few parts of positive action; and, from the construction of which springs and like members are eliminated, and such elements which operate to produce frictional resistance are substituted therefor.

Another object of the invention is to provide a shock-absorbing device which interposes a frictional resistance to the transmission of the shock, principally in the direction or lines of the shock-travel or transmission from the traction mechanism, but which also interposes frictional resistance in lateral lines as well.

Other objects of the present invention not at this time more particularly enumerated will be clearly understood from the following detailed description of the present invention:

With the various objects of the present invention in view, the said invention consists, primarily, in the novel construction of shock-absorbing device hereinafter set forth; and, furthermore, this invention consists in the novel arrangements and combinations of the various parts, as well as in the details of the construction thereof, all of which will be hereinafter more fully described, and then finally embodied in the clauses of the claim which are appended to and which form an essential part of this specification.

The invention is clearly illustrated in the accompanying drawings, in which :—

Figure 1 is a detail side elevation of the novel shock-absorber as applied between the chassis or frame of the vehicle-body and the vehicle-springs connected therewith. Fig. 2 is a transverse vertical section, on an enlarged scale, of the shock-absorber, said view illustrating the normal initial relation of the several elements of the device, said view showing a series of spherical bodies or balls in their normally inactive relation with the cam-surfaces of the main body-portion and a cam body comprising parts of the shock-absorber, the parts with relation to the spherical bodies or balls having a slight rotary motion; and Fig. 3 is a similar view of the same parts, showing the relative positions of the movable parts after such slight rotary motion. Fig. 4 is a transverse cross-section, taken on line 4—4 in said Fig. 2.

Similar characters of reference are employed in all of the hereinabove described views, to indicate corresponding parts.

Referring now to the said drawings, the reference-character 1 indicates a portion of the chassis or frame of a vehicle, such for example as an automobile, and 2 one of the vehicle-springs connected therewith, by means of which the axle-frame 3 of the traction-mechanism is resiliently connected with said chassis or frame 1.

The novel shock-absorber made according to and embodying the principles of the present invention comprises a disk-like or circular body-portion 4 provided with a centrally disposed tubular hub 5 extending or projecting from the inner side thereof, said hub 5 being formed at its free end with a reduced extension 6. Said body-portion 4 is further provided, adjacent to its marginal edges, with an annular or circumferential transverse wall 7, the inner surface of said wall 7 being formed so as to provide a series of concave cam-surfaces 8, which are equally spaced around the said wall 7.

The reference-character 9 indicates another disk-like or circular body-portion also provided with a centrally disposed portion forming a cam-body 10, said cam-body and said disk-like or circular body-portion being further provided with a centrally disposed transverse opening 11 to permit the said cam-body and said body-portion to be journaled upon the hub 5 of said body-portion 4. Said body-portion 9 is further provided, adjacent to its marginal edges, with an annular or circumferential transverse wall 12, which is telescopically arranged over the outer surface of the transverse wall 7 of said body-portion 4, so that the respective body-portions and their transverse walls are rotatably related with relation to one another. The said cam-body 10 is provided in its peripheral surface with a series of concave cam-surfaces 13 which are equally spaced apart, and are disposed so as to register immediately opposite the said concave cam-surfaces 8, when the respective body-portions 4 and 9 are in their normal positions with relation to each other.

Arranged within the spaces 14, intervening between the respective oppositely facing concave cam-surfaces 8 and 13 are spherical members or balls 15, which substantially contact at opposite points of their surfaces with the said concave cam-surfaces 8 and 13 when the parts are in their normal initial positions. The width of the space between the inner surfaces of said body-portions 4 and 9 is substantially limited to the diameter of said spherical members or balls 15, to permit of a slight rotary motion of the parts, the said spherical members or balls contacting at transversely opposite points of their surfaces with the respective body-portions 4 and 9, but without interfering with the slight rotary movements of the said parts 4 and 9.

The reference-character 16 indicates a disk-member having a central perforation 17, by means of which said disk-member is secured upon the reduced extension 6 of said hub 5, a bolt 18 and nut 19, together with suitably disposed washers 20, being passed through said tubular hub 5, and serving to retain the above described parts in their properly inter-related positions. Projecting from the marginal edge of the said body-portion 4 is an arm 21, and, in like manner, projecting from the marginal edge of the disk-member 16 is another arm 22 paralleling said arm 21. The respective arms 21 and 22 are inclined or bent toward each other so that their free ends register, and are thus secured together to form a portion 23, which is pivotally connected with a portion of the axle-frame 3 of the vehicle. Projecting from the marginal edge of the body-portion 9 is an arm 24, and extending from the outer edge of the wall 12 of said body-portion 9 is a flange or rim 25, from the marginal edge of which extends an arm 26 paralleling the said arm 24. The respective arms 24 and 26 are also inclined or bent toward each other so that their free ends register, and are thus secured together to form a portion 27, which is pivotally secured to a portion of the chassis or frame 1.

The action of the shock-absorber, constructed as hereinabove described, is as follows:—Any movement of the respective lever-arms 23 and 27 toward each other tends to rotate the related body-portions 4 and 9 in opposite directions, thus carrying their respective concave cam-surfaces 8 and 13 out of their registered alinement. This movement tends to produce a crowding or wedging of the balls 15 between the approaching oppositely inclined cam-surfaces with constantly increasing friction. The first stage of movement of the oppositely rotating body-portions produces but little friction; hence, the vehicle-spring 2 is permitted to work practically unresisted within the normal "spring" limits, so that the ordinary relative movement of the vehicle-body and frame 1 and the traction mechanism is permitted; but when an excessive "shock" or jar is imparted through the traction mechanism to said vehicle-spring, so that the spring tends to move beyond its normal "spring" limits, the increasing frictional resistance of the balls 15, as moved between the cam-surfaces 8 and 13, absorbs and tends to resist the passage of this "shock" to the vehicle-body and frame. The return or opposite rotation of said body-portions tending to return the respective cam-surfaces to their normal oppositely registering positions, is accomplished with constantly decreasing frictional resistance, so that the vehicle-spring quickly regains its normal limit of movement, before the "shock" has been transmitted to the vehicle-body and frame. The resistance offered by the mechanism is radial to the oppositely rotating body portions, but is interposed in the direction of the lines of the shock-travel or transmission.

In the construction of the novel shock absorber, as herein-above described, the arrangement of the parts is such, that a dust-proof and practically moisture-proof construction is offered, whereby the internal mechanism is protected from the deteriorating and obstructive effects of dirt, rust, and the like. It will be understood that there is no frictional resistance between the parts 7 and 12.

I claim:—

1. A shock-absorber comprising two relatively rotatable parts, one part comprising a body-portion provided with an annular circumferential wall, the inner surface of the latter having a series of concave cam-surfaces, the other part comprising a body-portion provided with a centrally disposed cam-body, the peripheral surface of which is provided with a series of concave cam-surfaces normally registering opposite the cam-surfaces of said first-mentioned part, a series of balls interposed between the respectively opposite cam-surfaces and riding in contact therewith, and lever-arms connected with said rotatable parts.

2. A shock-absorber comprising two relatively rotatable parts, one part comprising a body-portion provided with an annular circumferential wall, the inner surface of the latter having a series of equally spaced concave cam-surfaces, and a centrally disposed tubular hub connected with said body-portion, the other part comprising a body-portion provided with a centrally disposed cam-body, said body-portion and cam-body having a centrally disposed tubular opening for receiving the hub of said first-mentioned body-portion, the peripheral surface of said cam-body being provided with a series of equally spaced concave cam-surfaces normally registering opposite the cam-surfaces of said first-mentioned body-portion, a series of balls interposed between the respectively opposite cam-surfaces and riding in contact therewith, and lever arms connected with said rotatable parts.

3. A shock-absorber comprising two relatively rotatable parts, one part comprising a body-portion provided with an annular circumferential wall, the inner surface of the latter having a series of equally spaced concave cam-surfaces, and a centrally disposed tubular hub connected with said body-portion, the other part comprising a body-portion provided with an annular circumferential wall adapted to telescope snugly over the wall of said first-mentioned body-portion, and further provided with a centrally disposed cam-body, said body-portion and its cam-body having a centrally disposed tubular opening for receiving the hub of said first-mentioned body-portion, the peripheral surface of said cam-body being provided with a series of equally spaced concave cam-surfaces normally registering opposite the cam-surfaces of said first-mentioned body-portion, a series of balls interposed between the respectively opposite cam surfaces and riding in contact therewith, and lever-arms connected with said rotatable parts.

4. A shock-absorber comprising two relatively rotatable parts provided with transverse telescoping outer walls, a series of concave cam-portions spaced around the inner side of the transverse wall of one part, a cam-body connected with the other part provided at its periphery with a series of concave cam-portions normally registering opposite the cam-portions of said first-mentioned part, and balls lying between the respectively facing cam-portions and contacting therewith.

5. A shock-absorber comprising two relatively rotatable parts provided with transverse telescoping outer walls, a centrally perforated cam-body connected with one of said parts, a tubular hub connected with the other of said parts and extending through the perforation of said cam-body, a series of concave cam-portions spaced around the inner side of the transverse wall of one of said parts, a series of concave cam-portions spaced around the periphery of the cam-body of the other of said parts and normally facing said first-mentioned cam-portions, balls lying between the respectively facing cam-portions and contacting therewith, and lever-arms connected with said rotatable parts.

6. A shock-absorber comprising two relatively rotatable parts provided with transverse telescoping outer walls, a centrally perforated cam-body connected with one of said parts, a tubular hub connected with the other of said parts and extending through the perforation of said cam-body, a series of concave cam-portions spaced around the inner side of the transverse wall of one of said parts, a series of concave cam-portions spaced around the periphery of the cam-body of the other of said parts and normally facing said first-mentioned cam-portions and contacting therewith, a reduced extension projecting from said tubular hub, a disk-member secured thereto, a bolt and nut for securing said rotatable parts and said disk-member in their properly related arrangement, a lever-arm connected with one of said rotatable parts and said disk-member, and a second lever-arm connected with the other rotatable part.

In testimony, that I claim the invention set forth above I have hereunto set my hand this 18th day of April, 1912.

BASIL W. MATTHEWS.

Witnesses:
   FREDK. L. FRAENTZEL,
   FREDK. N. W. FRAENTZEL.